April 16, 1963 E. L. COLLIER 3,085,883
CONFECTION WITH PRIZE
Original Filed Dec. 3, 1956 2 Sheets-Sheet 1
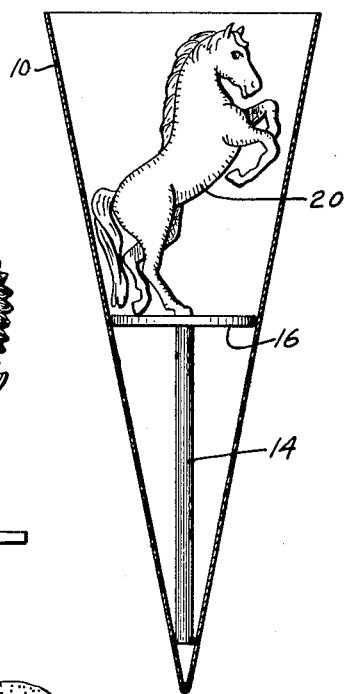
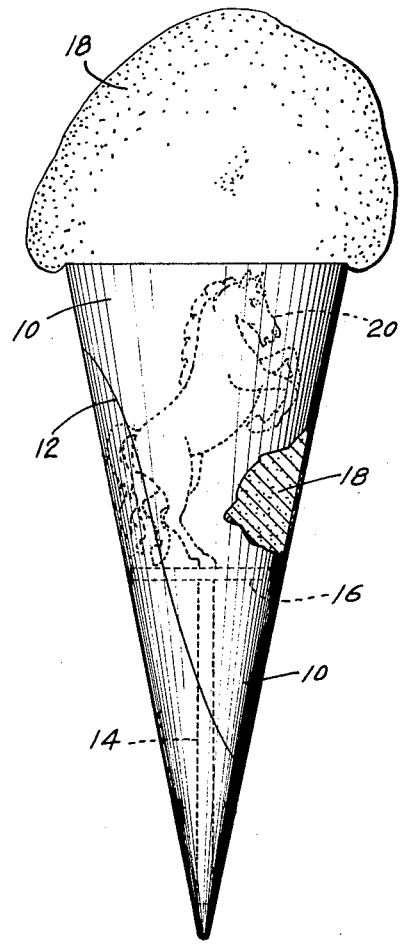
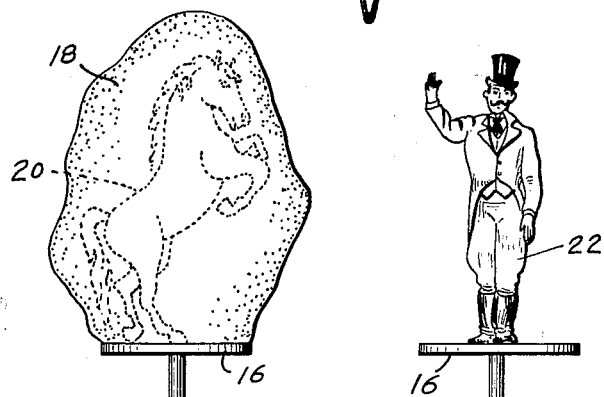
INVENTOR.
EUGENE L. COLLIER
BY 
ATTORNEY

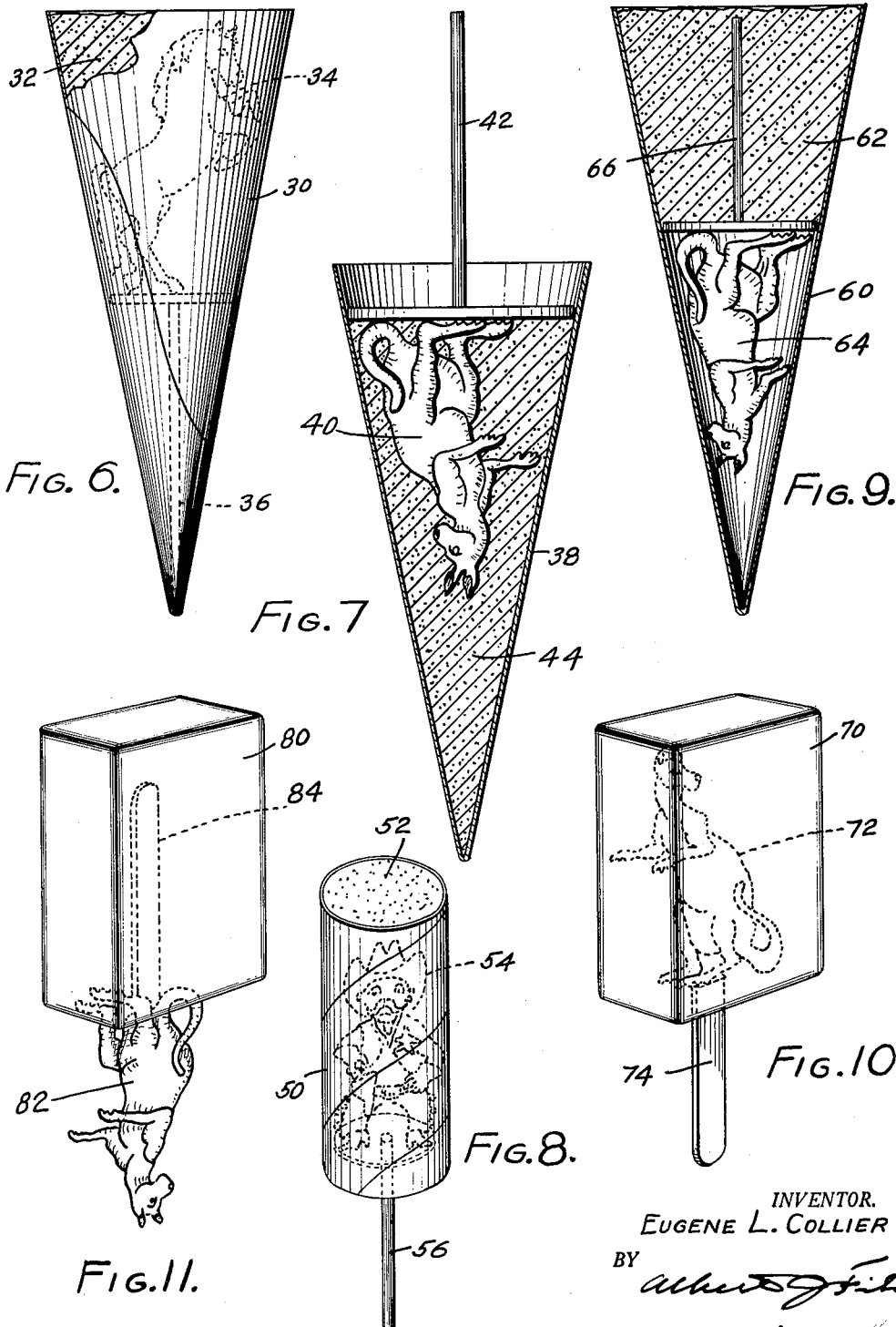

United States Patent Office 3,085,883
Patented Apr. 16, 1963

3,085,883
CONFECTION WITH PRIZE
Eugene L. Collier, Inglewood, Calif., assignor of one-third each to Bruce B. Parker and Joseph B. Orrell, both of Los Angeles, Calif.
Continuation of application Ser. No. 625,902, Dec. 3, 1956. This application Sept. 15, 1961, Ser. No. 140,163
4 Claims. (Cl. 99—137)

This invention relates to an improved confection with prize and has for one of its principal objects, the provision of a device of the class described, which comprises, in combination, an edible confection such as ice cream and an inedible object in the form of a statuette or the like, which can be preserved as a prize for the person consuming the confection, usually a child.

One of the important objects of the invention is the provision in an ice-cream cone, lollipop, or the like, of an additional inedible element which is in the nature of a surprise which comes to light when the ice cream or other edible confection, is more or less consumed, and which can be used as part of a collection of similar items and traded for others of a similar nature.

Another, and further, important object of this invention is to provide a confection, having a concealed prize therein, which confection is so constructed that the prize is not ordinarily visible from the exterior and wherein the prize itself is composed of a material which will not, in any way, damage the teeth or digestion of the consumer.

Yet another object of the invention is the provision of a packaged edible confection, including ice cream or the like, which is properly wrapped against contamination or disfiguration and which, when unwrapped, will disclose a suitable support or means for handling the same while it is being consumed, without any danger of dropping, dripping or smearing any portions of the confection onto the person or garments of the consumer or others.

Other and further important objects of this invention will be apparent from the disclosures in the accompanying drawings and following specification.

The invention, in a preferred form, is illustrated in the drawings and hereinafter more fully described.

In the drawings:

FIGURE 1 is a view, partly in section, of the container and prize combination of the confection of this invention, showing the same before filling.

FIGURE 2 is a view similar to FIGURE 1, but showing the container filled with ice cream, or the like, and illustrating the ice cream or other edible element, partly in section, and showing the prize and handle in phantom view.

FIGURE 3 is an illustration of the confection with the prize of this invention, showing the same as removed from the wrapper and partly consumed.

FIGURE 4 is a detail view of the prize and handle portion of the device of this invention, showing the same before being inserted in the container.

FIGURE 5 illustrates another prize, the number and variety of which, of course, is unlimited.

FIGURE 6 illustrates the condiment of this invention in somewhat the same embodiment as that shown in FIGURES 1 and 2 but in a slightly altered packaging arrangement.

FIGURE 7 shows another embodiment of the invention.

FIGURE 8 illustrates a still further modification of the confection of this invention.

FIGURE 9 depicts a still further modified form thereof.

FIGURE 10 illustrates a construction somewhat along the line of that shown in FIGURE 8.

FIGURE 11 relates to a somewhat reversed type of confection of FIGURE 10.

As shown in the drawings:

The reference numeral 10 indicates generally a conical container, preferably of waxed paper, or the like, which is commonly employed in connection with the packaging and vending of small low-priced edible confections, such as ice-cream cones, lollipops, or similar comestibles. The wrapper 10 is so constructed that it can be readily removed by tearing along line 12, or in some other similar fashion.

Adapted to be inserted into the lower end of the conical container 10 is a holder for the confection which comprises a stick or bar 14, this being preferably of plastic or relatively soft material such as twisted waxed paper, or the like, so that it will not injure the mouth or throat of a child or other person, who might happen to fall while eating the ice cream or other food product. A disk 16 is attached to one end of the stick, or the like, 14 in any suitable manner and this provides a support for the ice cream or other food product 18, when the conical container 10 is filled, and according to the plans of this invention, also provides a support for a statuette or similar article 20, which forms the prize or surprise of the product of this invention.

As shown in FIGURES 1, 2 and 3, the statuette may be of some animal, such as a horse, and as shown in FIGURE 4, the statuette may be that of a human being 22, and obviously such a statuette may represent any famous historical or famous character, such as the President of the United States, a famous baseball player, a magician, a circus ringleader, or any other notable or athlete.

In FIGURE 5, a fancy Indian character 24 is depicted and here again, the number and variety of the objects to be employed as prizes, is substantially innumerable. Cowboys, pirates, movie actors, actresses and others may be represented.

In FIGURE 6, a container 30, having ice cream, or the like, 32 therein, which ice cream contains and surrounds a statuette or similar image 34, supported by a stick or handle 36. In this embodiment of the invention, the conical container 30 is filled simply to the level of the top which provides a better package for handling and shipping. As illustrated in FIGS. 1, 2, and 6, the bottom of stem 14 fits snugly, with a circular line of engagement, in the conical container 10 of waxed paper at a position spaced from the disk 16.

In FIGURE 7, a conical container 38 of paper or some such similar material is employed for the ice cream 44 and a statuette, or the like, 40 is imbedded with a handle or stick 42 protruding therefrom. When the wrapper 38 is removed, the ice cream is consumed from the pointed end in an obvious manner.

In FIGURE 8, a cylindrical container 50 of ice cream, or the like, 52 is provided with a statuette 54 therein which, in this case, represents a cowboy or similar character. The whole is supported by a stick or length of twisted paper, or plastic material, 56.

In FIGURE 9, a conical container, similar to that shown at 10 in FIGURE 2 and at 30 in FIGURE 6, is employed but in this case, the statuette which may be that of some animal, such as a kangaroo 65, is in the unfilled lower end of the container 62 with the stick portion 66 imbedded in the ice cream. In this embodiment, the purchaser will soon become informed as to the nature of the prize, which then is employed as a handle for consuming the confection.

In FIGURE 10, a bar of ice cream or the like 70, in the shape of a rectangular parallelepipedon, is employed, having a statuette or the like 72 imbedded therein and here again, some animal, such as a kangaroo, may be depicted. The statuette and the ice cream are both supported on a handle 74 which, in this case, may be in the form of a flat stick.

In FIGURE 11, the structure of FIGURE 10 is somewhat reversed, in that the prize 82 in the form of a statuette representing a kangaroo or the like is immediately open to the view of the purchaser, the same being supported on a stock 84, which stick is imbedded in the confection 80.

The statuettes themselves must be composed of some material which will not harm the teeth, digestion or health of the consumer and there are many types of such materials available, particularly some of the plastics, which will be sufficiently resilient so as not to affect the teeth and will be insoluble whereby no portion thereof, can possibly enter the digestive tract of the consumer. The size may be varied considerably and any suitable means of attaching the statuette to the support can obviously be employed so long as the same conforms to the requirements of local or Federal Health and Food laws.

It will be evident that herein is provided a novel form of confection with a contained prize, in the nature of a concealed object, which contains the element of surprise, thereby tempting the purchaser to buy the confection in the hopes of obtaining a particularly desired statuette, or other object, representing some particular person, animal or other element.

The statuettes, or other objects, may then be employed by children or even young adults or teenagers, in the rather common practice of trading such articles and completing a collection.

I am aware that many changes may be made and numerous details of construction varied throughout a wide range without departing from the principles of this invention, and I, therefore, do not propose limiting the patent granted hereon otherwise than as necessitated by the prior art.

The present application is a continuation of my pending application, Serial No. 625,902, entitled "Confection With Prize," filed December 3, 1956, allowed March 17, 1961, and which will be abandoned in favor of this application.

What I claim is:

1. As a new article of manufacture, a confection comprising a conical container, a circular disk positioned about midway of the axis of the container and perpendicular thereto, said disk fitting snugly the inside wall of the container to divide the interior of the container into two compartments of approximately equal axial dimensions, a holder in the smaller lower compartment, secured to the center of the disk and extending to a point proximate the apex of the container, a statuette of inedible plastic material to serve as a prize secured to the disk on the side opposite the holder, and a confection in the upper compartment enveloping the statuette.

2. As a new article, a confection comprising a container having a conical surface; an insert, including a circular disk snugly fitting the conical surface of the container to divide the interior of the container into two compartments, a stem secured to one face of the disk, a statuette serving as a prize, secured to the opposite face of the disk; and an edible confection in one of said compartments; in which article a portion of the insert, spaced from the disk, engages the container to maintain the disk perpendicular to the axis of the conical surface of the container, whereby the disk is held against tilting while the edible confection is being placed in said one compartment.

3. The article of claim 2, in which the edible confection is frozen, envelopes the statuette, and is in the upper compartment.

4. The article of claim 2, in which the container is a cone shaped piece of inedible cellulose material, the insert is of inedible plastic, the edible confection is ice cream, and the end of the stem of the insert snugly engages the inside of the container proximate the apex of the cone so as to have a circular line of engagement with the container wall.

References Cited in the file of this patent

UNITED STATES PATENTS

| | | |
|---|---|---|
| 1,933,596 | MacLean | Nov. 7, 1933 |
| 2,132,966 | O'Brien | Oct. 11, 1938 |
| 2,226,474 | Knowlton | Dec. 24, 1940 |
| 2,469,589 | Barricini | May 10, 1949 |